UNITED STATES PATENT OFFICE.

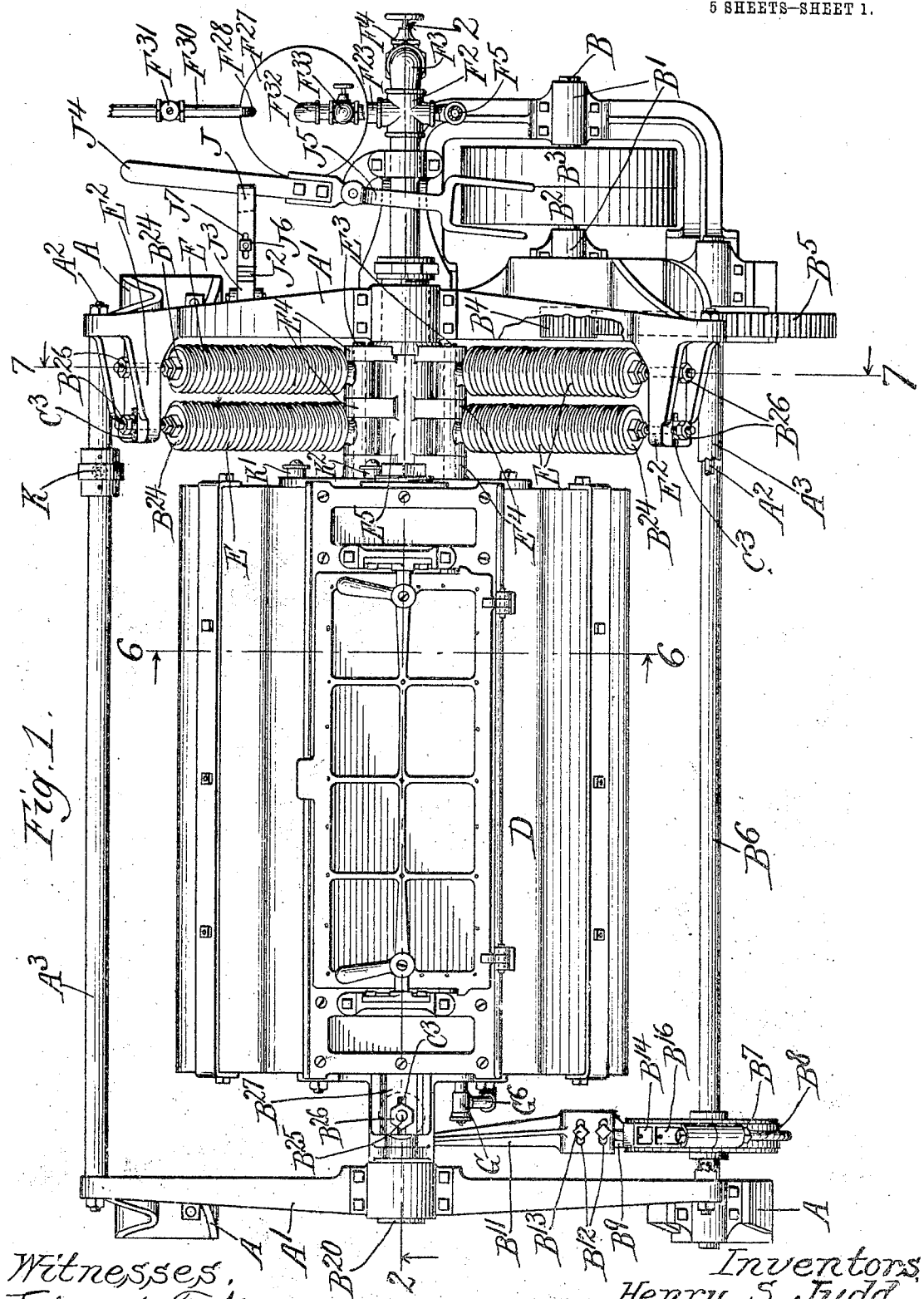

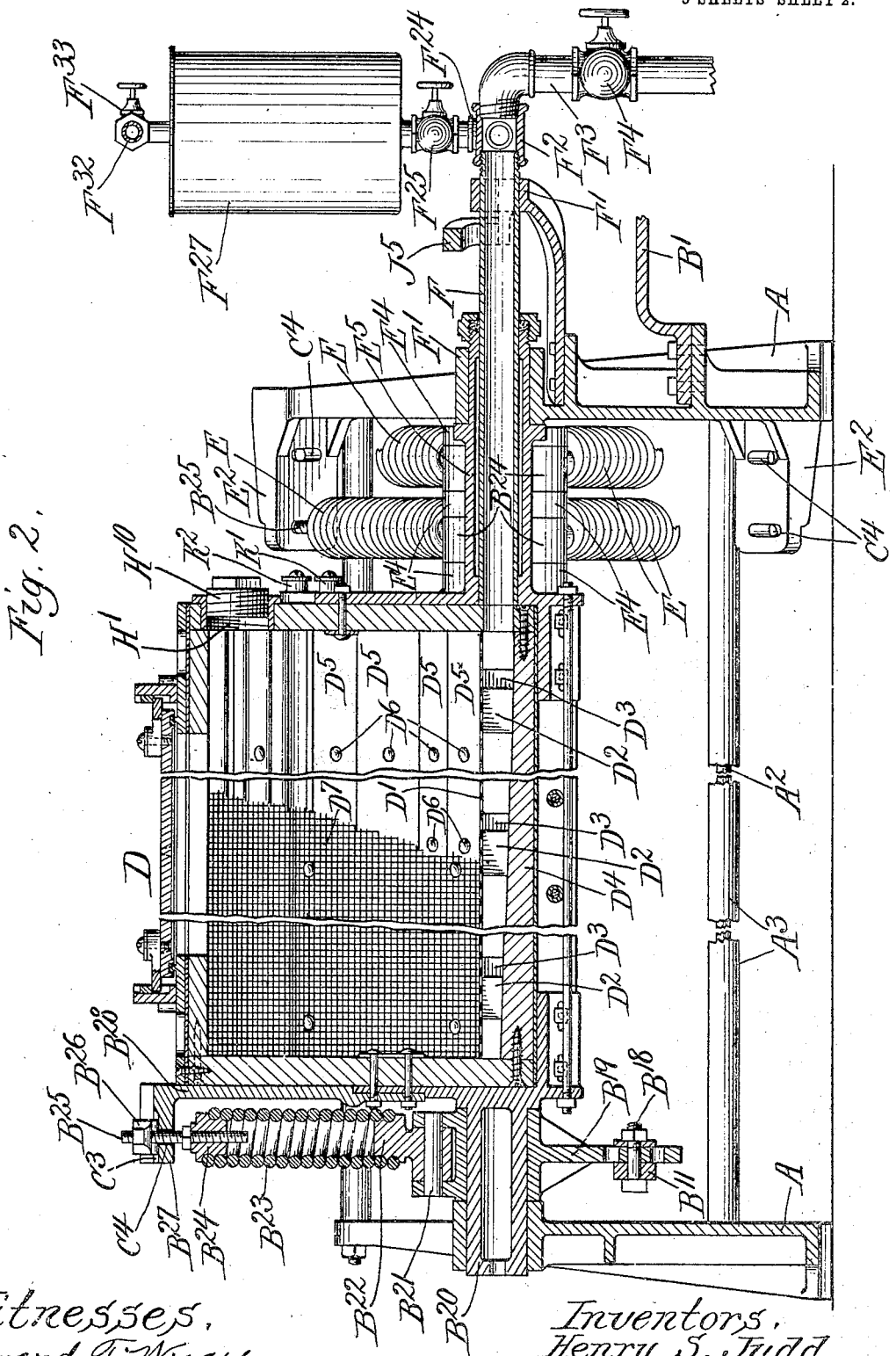

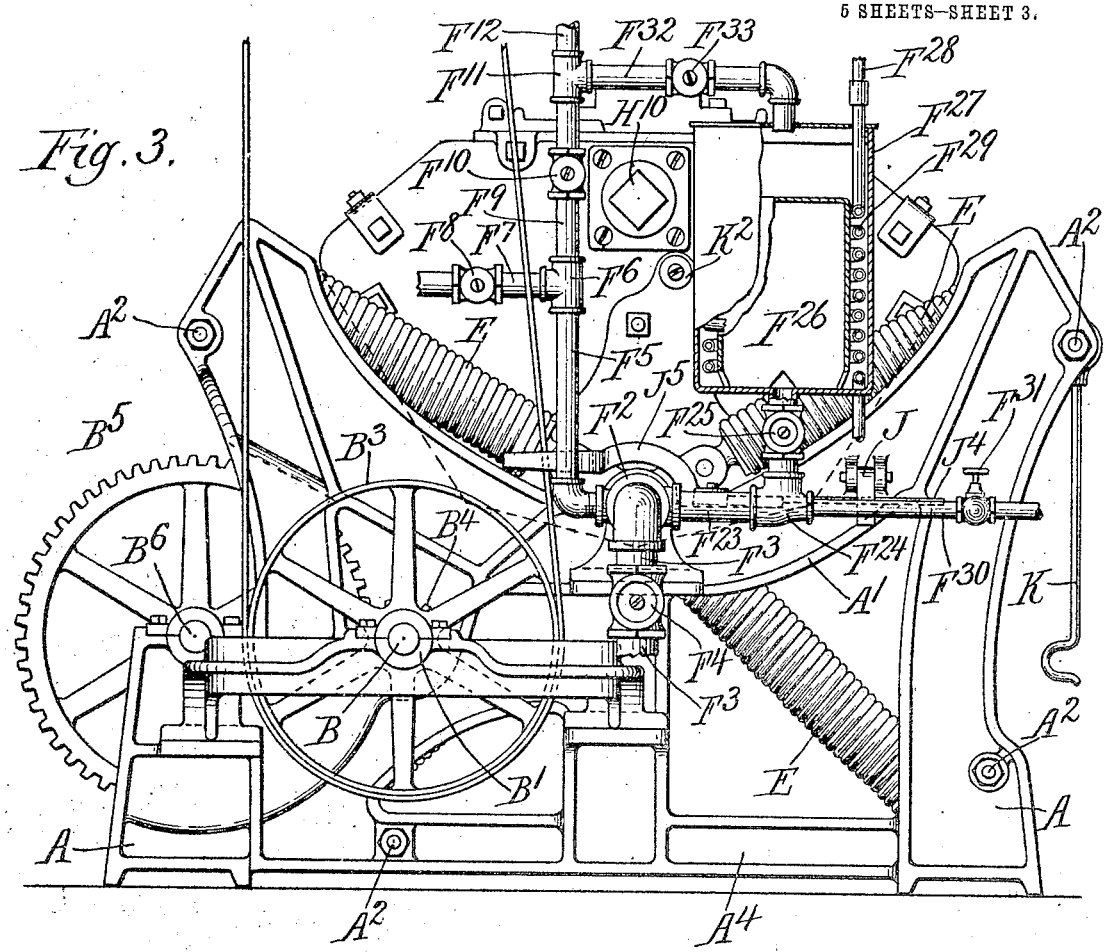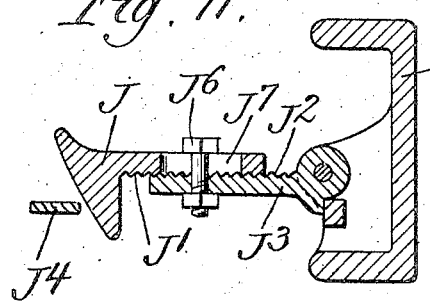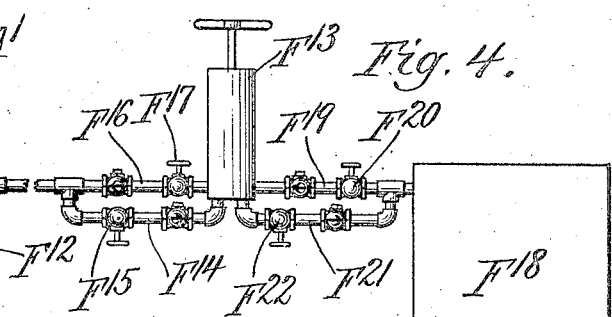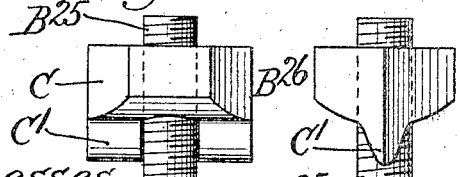

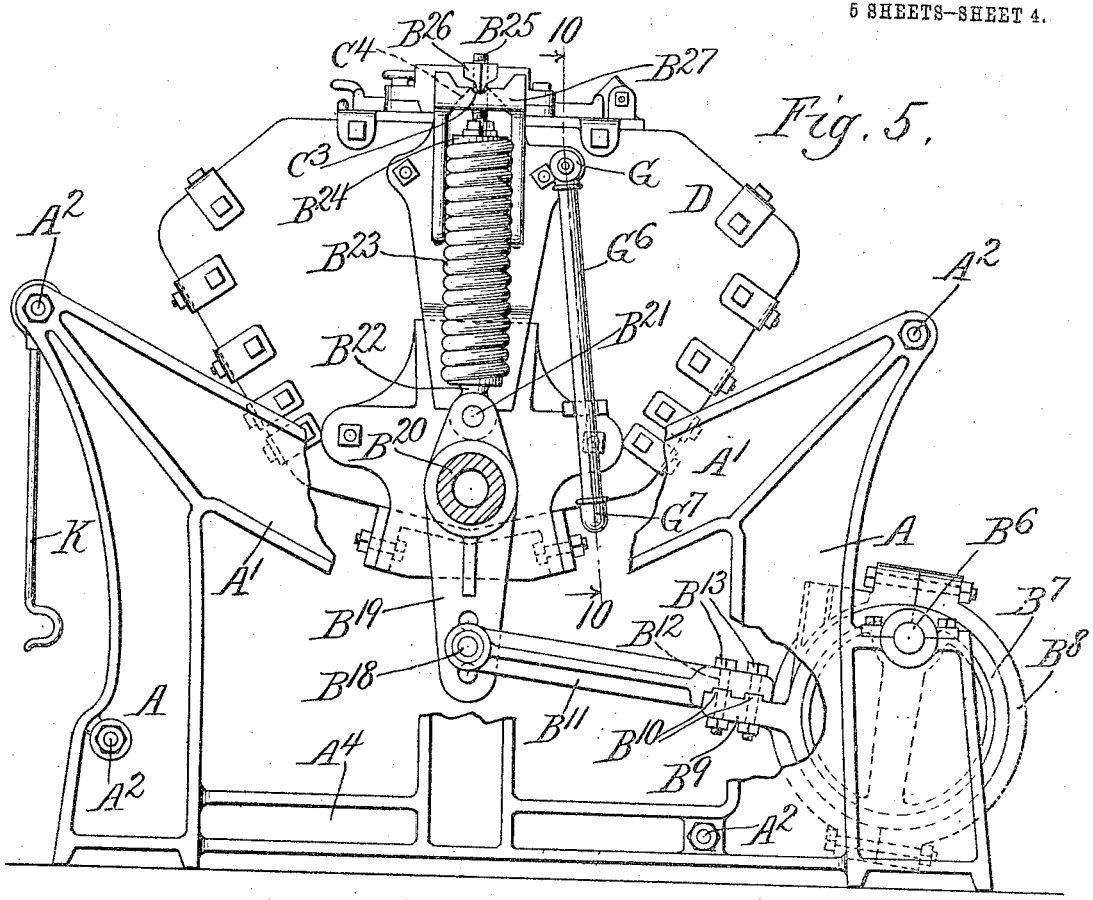

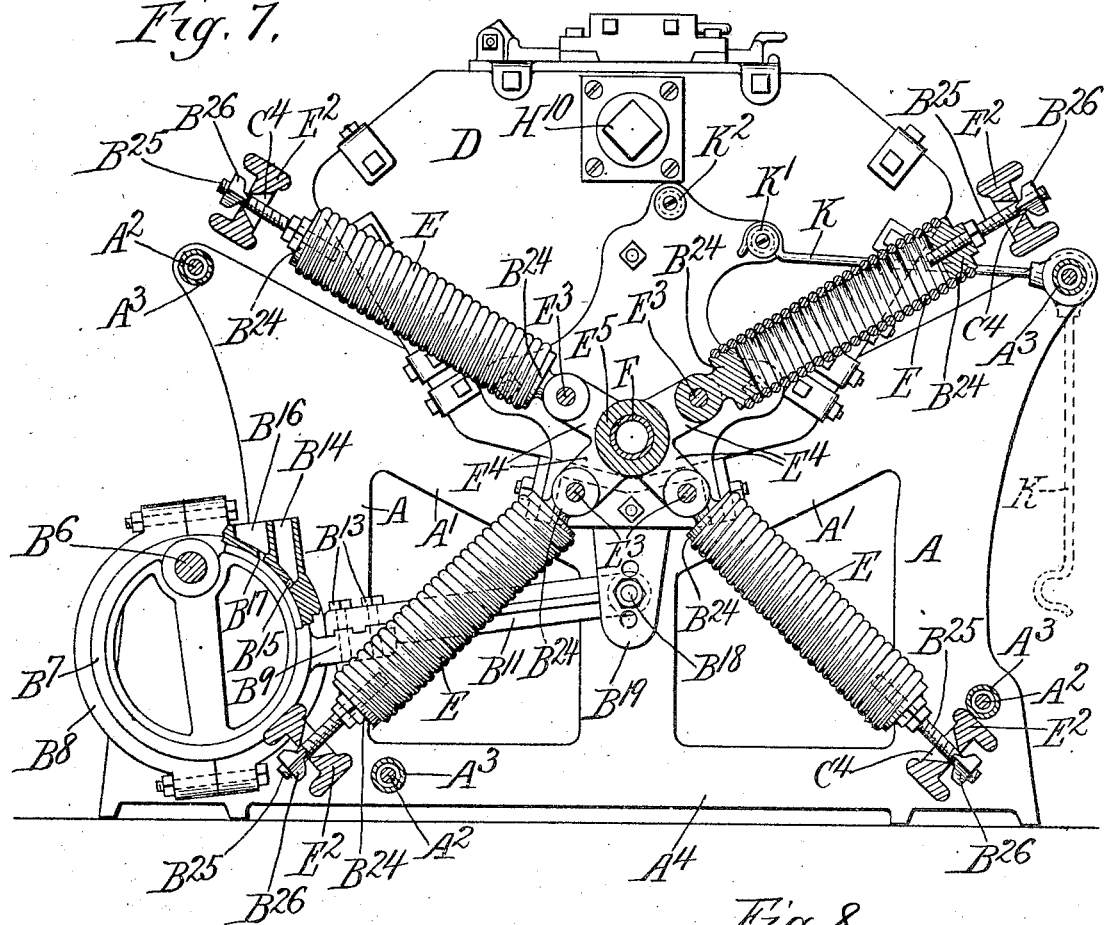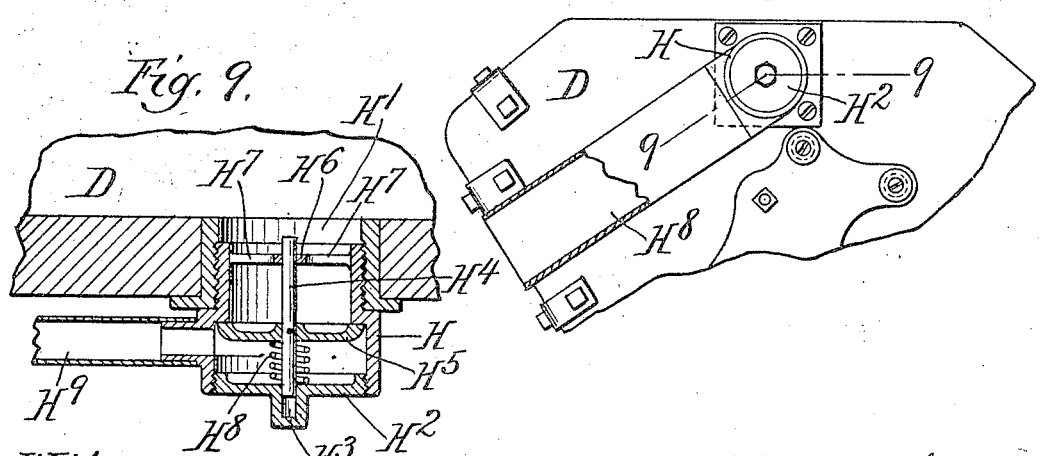

HENRY S. JUDD AND HENRY PLETSCH, OF CHICAGO, ILLINOIS, ASSIGNORS TO JUDD LAUNDRY MACHINE COMPANY, OF CHICAGO, ILLINOIS, A CORPORATION OF DELAWARE.

LAUNDRY-MACHINE.

1,131,842.   Specification of Letters Patent.   Patented Mar. 16, 1915.

Application filed March 30, 1910. Serial No. 552,347.

*To all whom it may concern:*

Be it known that we, HENRY S. JUDD and HENRY PLETSCH, citizens of the United States, residing at Chicago, in the county of Cook and State of Illinois, have invented a certain new and useful Improvement in Laundry-Machines, of which the following is a specification.

Our invention relates to laundry cleaning and dyeing machines and has for its object to produce certain new and useful improvements therein.

It is illustrated in the accompanying drawings, wherein—

Figure 1 is a plan view of our machine with parts broken away; Fig. 2, a longitudinal section on the line 2—2 of Fig. 1; Fig. 3, an end elevation of the supply side with parts broken away; Fig. 4, a detail of a part of the circulating system; Fig. 5, an end view on the driving side with parts broken away; Fig. 6, a cross section on line 6—6 of Fig. 1; Fig. 7, a cross section on line 7—7 of Fig. 1; Fig. 8, a detail end view of the dye relief valve; Fig. 9, an enlarged section on line 9—9 of Fig. 8; Fig. 10, a detail of the dry cleaning relief valve; Fig. 11, a detail of the device for locking the machine in or out of operation; Figs. 12 and 13, details of the rocking nuts.

Like parts are indicated by the same letter in all the figures.

A, A are legs which support the frame portion, which consists principally of end bows $A^1$ $A^1$, the longitudinal rods $A^2$ $A^2$, with the inclosing spacing tubes $A^3$ $A^3$, and the bottom cross pieces $A^4$. These, with other parts not specifically described, constitute the frame of the machine.

The driving mechanism consists of the following elements: B is a shaft mounted in the bearings $B^1$ $B^1$ supported properly on the frame and carrying the fast and loose pulleys $B^2$ $B^3$, whereby the shaft B is driven from a suitable source of power. On one end of the shaft B is the pinion $B^4$ meshing with the gear $B^5$ on the shaft $B^6$, the other end of which carries the eccentric $B^7$ about which is secured the eccentric strap $B^8$ from which projects the arm $B^9$ having the lugs $B^{10}$ adapted to engage corresponding recesses in the eccentric rod $B^{11}$. The rod $B^{11}$ is provided with the slots $B^{12}$ and is held by means of the bolts $B^{13}$ to the arm $B^9$. On the outside of the pitman strap is the oil cup $B^{14}$ with the aperture $B^{15}$ and the oil cup $B^{16}$ with the aperture $B^{17}$. The eccentric rod is pivotally connected at $B^{18}$ to the lower end of an oscillating bar $B^{19}$, which is pivotally mounted on the trunnion $B^{20}$. The other end of this oscillating bar is pivotally connected by the pin $B^{21}$ with one end of the screw plugs $B^{22}$ which is adapted to enter and hold the spring $B^{23}$. The other end of this spring is provided with one of the screw plugs $B^{24}$ through which projects one of the bolts $B^{25}$ on which is mounted one of the rock nuts $B^{26}$. This screw bolt passes through an aperture in the head $B^{27}$ mounted on the standard or lug $B^{28}$ which is secured to the tub or cylinder. There are a number of these rock nuts and a description of one with its associated parts will suffice for all. Each of these rock nuts $B^{26}$ consists of the body portion C with the downwardly projecting rounded and sharpened rib $C^1$ thereon and is threaded to engage the bolt $B^{25}$. The standard or lug or similar part is grooved at $C^3$ to receive this rib and is apertured at $C^4$ by an aperture widening downwardly so as to let the screw bolt $B^{25}$ pass therethrough and play therein. In this manner all of the rock nuts are shaped, connected and mounted.

D is the cylinder or tub proper. It is preferably shaped substantially as shown. It has within a false bottom $D^1$ supported on diagonally arranged blocks, the sides of which are indicated at $D^2$ and the ends at $D^3$. These blocks are separated at their inner ends by a considerable distance as indicated in Fig. 6. The bottom of the cylinder or tub is composed of parts $D^4$ $D^4$ which are inclined inwardly toward the axial line and inclined also from one end of the hub toward the other so as to direct the fluids below the false bottom toward the lowest part of the tub. The sides of the tub are preferably composed of exterior sheet metal with interior boards $D^5$ matched and grooved and preferably held in position by bolts $D^6$. Within the tub is a false perforated lining $D^7$ of any desired shape but mounted so as to leave an interval $D^8$ between the lining and the inner surface of the outer wall of the tub.

E E are retracting or tension springs provided each at its outer end with one of the screw plugs $B^{24}$, one of the bolts $B^{25}$ and one of the oscillating nuts $B^{26}$ thereon associated with an aperture $C^4$ in one of the lugs $E^2$ which projects from the frame. These rock nuts, associated parts and apertures are shaped and arranged the same as that one previously described. The inner end of each of these tension springs is provided with one of the screw-threaded plugs $B^{24}$ pivotally connected by the pin $E^3$ to projections $E^4$ on the hub $E^5$ which is permanently and rigidly secured to the end of the tub and apertured to permit the passage of the tubular trunnion therethrough.

The circulating system comprises the tubular trunnion F which enters the tub at the lowest part and is securely mounted in the bearings $F^1$ $F^1$. It terminates at its outer end in a T $F^2$ from which leads the discharge pipe $F^3$ controlled by the valve $F^4$. From the T also rises the supply pipe $F^5$ terminating in a T $F^6$ from one end of which leads the water supply pipe $F^7$ controlled by the valve $F^8$. From this T also leads the pipe $F^9$ controlled by the valve $F^{10}$ to the T $F^{11}$ whence leads the pipe $F^{12}$. This pipe is connected with the pump $F^{13}$ by the pipe $F^{14}$ controlled by the valve $F^{15}$ or the pipe $F^{16}$ controlled by the valve $F^{17}$. The pump is connected with the tank $F^{18}$ by the pipe $F^{19}$ controlled by the valve $F^{20}$ or by the pipe $F^{21}$ controlled by the valve $F^{22}$. The pipe $F^{23}$ communicates by means of the T $F^{24}$ and valve $F^{25}$ with the benzin tank $F^{26}$ which is contained within the tank $F^{27}$, the steam pipe $F^{28}$ being adapted to heat the contents of said tank by means of the coils $F^{29}$. The pipe $F^{30}$ controlled by the valve $F^{31}$ communicates with a boiler or any other suitable steam generating means to permit the introduction of steam into the tub. The pipe $F^{32}$ controlled by the valve $F^{33}$ leads from the T $F^{11}$ and discharges into the tank $F^{29}$. Suitable stop valves are interposed in these several pipes as may be necessary.

The safety valve G comprises the valve member $G^1$, seat $G^2$ and spring $G^3$, is provided with the screw-threaded pipe $G^4$ to engage the hole $G^5$ in the upper portion of the end wall of the tub, and discharges through the pipe $G^6$, elbow $G^7$ and pipe $G^8$ into the atmosphere below the tub.

In Figs. 8 and 9 is illustrated a pressure relief valve. The valve casing H is screw-threaded in the hole $H^1$ and is closed at one end by the screw-cap $H^2$ which is provided with the bearing $H^3$ for the valve rod $H^4$ which carries the valve member $H^5$ and is supported at the other end by the short bearing $H^6$ mounted upon the arms $H^7$. The spring $H^8$ is located between the valve member $H^5$ and the cap $H^2$. The discharge pipe $H^9$ leads from the valve to the edge of the tub.

In Fig. 3 is shown the plug $H^{10}$ inserted in the place of the sleeve H. The hook J provided with the corrugated surface $J^1$ adapted to engage the corrugated surface $J^2$ on the pivoted lug $J^3$ is adapted to engage the handle $J^4$ of the belt shifting lever $J^5$. The nut $J^6$ engaging the slot $J^7$ provides means for regulating the position of the hook member J. The hook K pivotally mounted upon the frame is adapted to engage the lug $K^1$ upon the tub to hold it in the central position, and to engage the lug $K^2$ to hold the tub in tilted position.

It will be evident that while in our drawings we have illustrated an operative device still many changes might be made in the shape, size and arrangement of the parts concerned without departing materially from the spirit of our invention. We wish, therefore, that these drawings be considered as in a sense diagrammatic and that we be not considered as limited to the particular arrangement shown therein.

The use and operation of our invention are as follows:—We provide a tub mounted upon a horizontal axis adapted to oscillate thereabout, an inclined bottom for the tub below a false bottom, a pipe entering the tub at its lowest point and adapted to serve both as a supporting trunnion or axle and as a means of ingress and egress for liquids to and from the pipe. We provide a perforated lining for the tub adapted to correspond more or less closely with the shape of the tub, and to be removed a certain distance from the exterior walls. This lining and this false bottom act to permit the motion of liquids through and around the clothes in the tub without clogging or interfering with the passage of material through the pipe. We provide a tank supplied with heating coils whereby the material may be discharged into the tub either hot or cold and discharging means from the tub to said tank; also means for introducing steam into the tub, and a further tank and piping and a pump whereby material may be forced from the tank into the tub. We have found that when the tub is in operation gases are generated and the pressure in the tub is raised to such a point that the movement of the tub is retarded and even in some cases completely arrested. In order to prevent this we supply a pressure relief valve discharging beneath the tub. This relief valve is one having a very large cross sectional area wherein a very slight movement of the valve member is necessary to get a very large opening. We provide very short bearings and mount the valve very loosely upon the bearings in order that clogging and gumming up of the valve may not occur. The tub is actuated by a lever driven by an eccentric rod, said lever connected with the tub by means of a spring. This spring is connected at the top end to a screw plug, a stud passing through this plug and engaging a rock nut. This stud is adjustable in the screw plug and all adjustments may be made without rotation of the rock nut. This enables us to do away with any undue projection of the stud from the rock nut which would be exceedingly dangerous and inconvenient, and we connect the eccentric strap by means of bolts and lugs and provide the eccentric rod with slots transverse thereto whereby the position of the rod may be shifted with regard to the strap.

We claim:—

1. A washing machine comprising the combination of an elongated, oscillatory tub having an opening at its end substantially in line with its bottom, a hollow trunnion communicating with said end opening in the tub, a trunnion at the opposite end of said tub, a driving lever mounted upon one of said trunnions and flexibly attached to the tub near its top, retractile springs radially extended between the tub and the sustaining frame respectively, and an inlet pipe united with the hollow trunnion whereby liquid may be fed into and withdrawn from the extreme bottom portion of the tub.

2. An elongated tub having a flat top and sides comprising two panels at an angle one with the other and with the top and a bottom comprising two panels making an obtuse angle one with the other, a perforated false lining for said sides and part of the top, said lining corresponding in shape with and slightly removed from the sides and the top, a perforated false flat bottom for the tub resting upon the actual bottom at the sides and removed from it at the center and projections upon the bottom of the tub between it and the false bottom, said projections angularly located and terminating at a short distance from the center line of the bottom.

3. A tub having a flat false bottom and an inclined bottom below said false bottom, a plurality of slanting vanes between said bottom and said false bottom, said vanes adapted to turn the liquid toward the center of the tub and an outlet from the tub at the lowest point of said inclined bottom.

HENRY S. JUDD.
HENRY PLETSCH.

Witnesses:
EDNA K. REYNOLDS,
SOPHIE B. WERNER.